United States Patent [19]
Batdorf

[11] 4,070,225
[45] Jan. 24, 1978

[54] METHOD OF USING STRUCTURAL ADHESIVE

[75] Inventor: Vernon H. Batdorf, Minneapolis, Minn.

[73] Assignee: H. B. Fuller Company, St. Paul, Minn.

[21] Appl. No.: 742,600

[22] Filed: Nov. 17, 1976

[51] Int. Cl.$^2$ ............................ C09J 5/00; B32B 27/38
[52] U.S. Cl. ...................................... 156/330; 156/331; 260/2 N; 260/47 EN; 260/29.2 EP; 260/830 P; 260/29.2 N; 427/386; 428/413; 428/416; 428/414
[58] Field of Search ........................ 156/311, 331, 330; 427/386; 428/414, 416, 413; 260/29.2 EP, 830 P, 78 R, 2 N, 18 PN, 47 EN, 29.2 N, 268 R, 268 PL

[56] References Cited

U.S. PATENT DOCUMENTS

| | | | |
|---|---|---|---|
| 2,847,395 | 8/1958 | Wear | 156/330 |
| 2,965,609 | 12/1960 | Newey | 260/47 EN |
| 3,019,076 | 1/1962 | Pardo et al. | 427/386 |
| 3,140,566 | 7/1964 | Wagner | 156/330 |
| 3,167,554 | 1/1965 | Ernst | 260/268 R |
| 3,212,946 | 10/1965 | Weller et al. | 156/330 |
| 3,242,141 | 3/1966 | Vertnik et al. | 260/268 PL |
| 3,251,708 | 5/1966 | Schmetterer et al. | 260/830 P |
| 3,385,744 | 5/1968 | Van Sciver | 156/330 |
| 3,557,056 | 1/1971 | Peerman | 260/74 EN |
| 3,666,597 | 5/1972 | Parnell | 156/305 |

*Primary Examiner*—William A. Powell
*Assistant Examiner*—J. J. Gallagher
*Attorney, Agent, or Firm*—Thomas M. Meshbesher

[57] ABSTRACT

The disclosed method for forming an epoxy adhesive-bonded joint between a plurality of substrates is particularly well suited to an assembly line operation. The method involves forming an intimate mixture of the two components of a two-part adhesive system under conditions such that substantial curing will not occur until heat and/or pressure are applied. The application of heat and/or pressure for a short period of time initiates the curing reaction which will continue to completion under substantially normal ambient conditions. The initial bond strength is sufficient to hold mated substrates together with the bond strength increasing even when the curing process is completed under normal ambient conditions. For example, substrates can be coated with an intimate mixture of a two-part system suitable for use in this invention, stored for a period of time, mated on an assembly line under cure initiation conditions, and allowed to cure at normal room temperature and atmospheric pressure. Generally, conventional epoxy resins known in the art will work in the disclosed invention. The active hydrogen-containing curing agents or coreactants used in the disclosed invention are primary-amine terminated polyamides having a ball and ring softening point of 60°–200° C.

20 Claims, No Drawings

METHOD OF USING STRUCTURAL ADHESIVE

CROSS REFERENCE TO RELATED APPLICATIONS

For the disclosure of polyamides which can be used in this invention see the copending application of Ramesh Mehta, Ser. No. 725,012, filed Sept. 20, 1976 and entitled Adhesive Systems Comprising a Bisamino Piperazine-Containing Polyamide.

FIELD OF THE INVENTION

This invention relates to a method for forming epoxy adhesive-bonded joints between a plurality of substrates. Another aspect of this invention relates to a stable, one-part latent or slow-curing adhesive system which is formulated from an epoxide and an active hydrogen-containing curing agent or coreactant, and substrates coated therewith. Still another aspect of this invention relates to a method for bonding a plurality of substrates in an assembly line process with an adhesive system formulated from an epoxide and a curing agent or coreactant.

DESCRIPTION OF THE PRIOR ART

Various means are known for temporarily fastening two substrates together until they can be permanently bonded, e.g. spot welding, solvent welding, mechanical clamping or fastening, etc. Solvent welding is ordinarily limited to plastics, and both welding and mechanical fastening can create distortion, dimpling, warping, nonconformity to tolerance requirements, or a need for refinishing.

Two-component thermosettable epoxy adhesive compositions are well known as are curable epoxides and various curing agents. Most of these known epoxy adhesive systems cure very slowly at room temperature and may require as much as several hours of cure time to develop a bond with significant strength. Ovens can be used to speed up the cure, but the use of ovens and/or mechanical positioning of substrates can greatly complicate assembly-line bonding techniques. Fast-curing epoxy resin systems are known (e.g. those using a Lewis acid catalyst), but these can be unsuitable where an "open time" is needed, as in the case where one of two substrates or both substrates are first coated with the adhesive and subsequently (perhaps several seconds or minutes later) positioned or clamped together for bonding. In short, the use of epoxy adhesive technology as a substitute for spot welding, seam welding, and mechanical fasteners in assembly line processes to hold two substrates (particularly metal substrates) together may require an epoxy system with both an open time capability and the ability to be cured without resorting to ovens or oven-like equipment. Thus, the selection of a suitable epoxy system for a spot-welding approach to assembly-line bonding is by no means straightforward.

The epoxy resin art is much broader than the field of structural adhesives, and it would be difficult to provide even a representative description of the whole field of epoxy technology. Needless to say, a wide variety of amine curing agents have been used with an equally wide variety of curable epoxide monomers, prepolymers, etc. The art of latent and/or slow-curing epoxy systems is also highly developed, as is the art of assembly-line bonding. However, as noted previously, it is difficult to select an epoxy adhesive system with the properties generally needed for asembly-line bonding.

SUMMARY OF THE INVENTION

It has now been found that when a suitable polyamide, dissolved in a suitable solvent is intimately blended with a suitable epoxide prepolymer, the solvent can be removed to form a uniform non-flowable curable adhesive mixture of epoxide and polyamide which has a very lengthy "open time". That is, the resulting, substantially solvent-free coating tends to be latent and may take days or even months to lose its ability to be cured with heat and pressure. Yet, the latent-curable coating or film can be cured sufficiently (e.g. with heat and pressure) to provide a minimum bond strength which increases with time. By using conventional epoxides with epoxide equivalent weights greater than 60 and primary-amine terminated polyamide curing agents with a ball and ring softening point of 60°–200° C. a mixture can be formed which, upon the initiation of the epoxide cure reaction, gives sufficient immediate bonding strength to hold the substrates together and which will continue to cure after the initiation conditions have been removed; that is, under normal ambient conditions. The mixture can be coated as a film on at least one of a plurality of substrates which can later be mated under epoxide cure initiation conditions (e.g. a temperature above the ball and ring softening point of the polyamide) to form a bond between the substrates.

Stated another way, this invention involves a method for forming an epoxy adhesive-bonded joint wherein: (a) a solution of the polyamide is applied to one or more surfaces, and this solution contains the epoxide prepolymer dissolved or dispersed therein; (b) most or substantially all of the solvent is removed from the resulting coating of adhesive (e.g. by evaporation); (c) the joint is formed by mating two surfaces and applying heat (and preferably also pressure) to provide epoxide cure initiation conditions; and (d) the epoxide cure initiation conditions are removed before the cure is complete. The cure then continues under normal ambient conditions, and can be completed under these conditions, if desired, e.g. in 1–40 days.

Preferred epoxy adhesives for use in the aforementioned method can be formulated as slow-curing or latent, curable one-part systems comprising a continuous phase of polyamide solution and an epoxide prepolymer phase dispersed therein.

DETAILED DESCRIPTION

The basic theory of epoxide chemistry is reasonably well understood, although an exact theoretical explanation for the variety of actions which occur during curing is not always possible. In theory, the vicinal or 1,2-epoxide rings (also called the oxirane ring) can be opened by interaction with a compound having an available unbonded pair of electrons. Once the ring is opened, further reactions with active hydrogen bearing substituents can occur. When the electron pair-containing compound is an active hydrogen-bearing amine (i.e. a primary or secondary amine), both the electron pair of the nitrogen and the active hydrogen can participate in the reaction. There is no perfect term for describing the function of a primary or secondary amine in this context, it is variously referred to as a "hardener", a "co-curative", a "curing agent", or a "co-reactant" for the epoxide. The terminology used to describe a component comprising a curable epoxide is also less than perfect. Sometimes this component is called an epoxy "resin". This may be a somewhat misleading way to refer to a monomer or a prepolymer capable of being cross-linked or hardened or cured to a resinous solid, particularly since the "resin" may be a low molecular weight material. Accordingly, it may be better to refer to a curable epoxide as a "prepolymer", it being understood that a "prepolymer" can be in a very low state of polymerization and need not contain any repeating units. For example, a diglycidyl ether of Bisphenol A with an equivalent weight equal to exactly ½ the theoretical molecular weight for a molecule containing only one Bisphenol A moiety would be included within the scope of the term "prepolymer". In any event, the net result of the joining of the amine molecule and the epoxide-containing molecule is an increase in molecular weight and, typically, cross-linking between epoxide-containing molecules to yield a thermoset resin.

THE EPOXIDE (PART A) COMPONENT

From the standpoint of effectiveness and commercial availability, an epoxide component typically preferred for use in this invention comprises a polyglycidyl ether of a polyhydric alcohol, preferably a polyhydric phenol (polyhydroxyaromatic compound). In the case of low molecular weight polyhydric phenols such as resorcinol, polyglycidyl ethers with an equivalent weight as low as about 100 are theoretically obtainable. With higher molecular weight polyhydric phenols such as Bisphenol A, epoxide equivalent weights (EEW's) of at least about 180 or 190 are more common. Many of the commercially available diglycidyl ethers of Bisphenol A have an EEW well in excess of 200, since the epoxy prepolymer can contain at least two, sometimes at least five, or even as many as about 10 repeating Bisphenol A moieties. See, for example, the structural formula at columns 1 and 2 of U.S. Pat. No. 2,878,234 (Peterson), issued Mar. 17, 1959, wherein it is pointed out that the repeating Bisphenol A-containing moiety enclosed within the parentheses can recur as many as 10 times.

As is known in the art, many other types of epoxy resins are commercially available, including the so-called aromatic and cycloaliphatic epoxides. (The polyglycidyl ethers of polyhydric phenols are considered "aliphatic" epoxides.) Some of the available epoxide prepolymers can include epoxide rings of differing reactivity (e.g. one aliphatic and one cycloaliphatic), as in the case of vinyl cyclohexene dioxide. Epoxide prepolymers used in this invention should have an epoxide equivalent weight (EEW) greater than 60 and preferably greater than 150. Both solid and liquid prepolymers can be used. Unless a solid prepolymer is used, there appears to be no advantage in using epoxy prepolymers with an equivalent weight greater than 2,000, and the ordinarily preferred EEW range for most commercial uses of this invention need not exceed about 1,000.

The polyglycidyl ethers of polyhydric phenols, the preferred type of epoxide prepolymer, are readily available from several suppliers, including Dow Chemical Co. (under the "DEN" and some of the "DER" trademarks) and Shell Oil Company (under the "EPON" series of trademarks). The purity of the "resin" (i.e. prepolymer) or other factors which can vary according to the source or supplier do not appear to be significant in this invention. It is ordinarily preferred that the epoxide component be essentially 100% solids material (i.e. be substantially free of solvent), although any desired amount of solvent can be used, e.g. 5–95% by weight of a polar organic liquid such as a chlorinated aliphatic liquid (e.g. methylene chloride), a monocyclic aromatic liquid (e.g. xylene), a volatile liquid amide such as dimethyl formamides, and mixtures thereof.

THE ACTIVE HYDROGEN (PART B) COMPONENT

The epoxides used in the adhesive systems of this invention are cured or hardened or co-reacted with an active hydrogen component comprising a primary-amine terminated polyamide with a ball and ring softening point of 60°–200° C. The polyamide is made from active hydrogen-containing components such as polyamines and polycarboxylic acids. As is known in the art, primary and secondary amino groups and carboxylic acid groups (—COOH) can react under condensation reaction conditions to form amide linkages, i.e. —N(R)—CO—, where R is H or an organic group. (Although less commonly used in industrial practice, there are various known functional equivalents of carboxylic acid starting materials, e.g. carboxylic acid halides, esters, anhydrides, etc.) If the carboxylic acid and amine groups tend to form ammonium salts, the condensation reaction can nevertheless be favored if the reaction conditions sufficiently provide for removal of water or other by-products of the condensation. The polyamines used to make the polyamide are preferably diamines, since difunctionality is extremely well suited to the synthesis of a polyamide co-curative or hardener which satisfies the molecular weight and equivalent weight requirements of the active-hydrogen component. Two or more types of diamine can ordinarily be used in combination as the polyamine reactant which combines with the polycarboxylic acid reactant (or equivalent thereof, e.g. acid halide, acid anhydride, etc.) to form the aforementioned polyamide. A preferred polyamide of this invention is the reaction product of a polyamine comprising a 1,4-bis-primary amino lower alkyl piperazine and a polyfunctional carboxylic acid or functional equivalent thereof. By 1,4-bis-primary amino lower alkyl piperazine is meant, for example, a compound of the formula

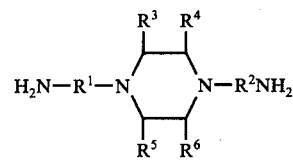

wherein $R^1$ and $R^2$ are lower alkylene (e.g. $C_2$–$C_6$ alkylene such as propylene, a commonly-available species being 1,3-propylene); and wherein $R^3$ through $R^6$ are the same or different and are hydrogen or other relatively inert substituents such as alkyl groups. A preferred and commercially available 1,4-bis-primary amino lower alkyl piperazine is 1,4-bis(3-aminopropyl) piperazine which has a molecular weight of 200.34 and is available from Jefferson Chemical Company, Inc. of Houston, Texas. According to Jefferson Chemical Company data sheets, 1,4-bis(3-aminopropyl) piperazine has an equivalent weight (by titration) of 66.9. The theoretical equivalent weight of a 1,4-bis,primary amino lower alkyl piperazine depends upon on how the amine functionality is defined. The primary amine functionality is theoretically 2, but 2 teritary nitrogens are also present—an important facet of these di-primary amine molecules. The terminal primary amines are believed to provide four highly available, sterically unhindered active hydrogen atoms, while the tertiary amine groups are believed to provide the benefits of high reactivity and low equivalent weight. That is, a high molecular weight polyamide containing a significant amount of 1,4-bis-primary amino lower alkyl piperazine appears to behave, in terms of reactivity, like a low equivalent weight co-curative or hardener.

As is known in the art, each primary amino (—NH$_2$) group can provide a branching point for the formation of a thermoset resin by reaction with epoxide prepolymers. This thermosettable characteristic of the polyamide co-curative or hardener can be important to the bond strength of the ultimately obtained thermoset adhesive system. However, a good bond should meet a variety of other requirements (e.g. relatively low brittleness) which are normally satisfied by greater physical flexibility and/or a reduction in the glass transition temperature of the cured system. In this invention the primary amine [e.g. 1,4-bis(3-aminopropyl) piperazine] can be combined with other polyamides and/or dicarboxylic acids in the polyamide to help avoid excessive brittleness, low shear, and low heat resistance. These other polyamines can be primary and/or secondary amines, including molecules with both primary amine and secondary amine functional groups. They can, if desired, comprise "flexibilizer" ingredients with polyoxyalkylene or polyester flexibilizing chains.

In making polyamides for use in this invention, the proportions and conditions can be manipulated to favor primary amine termination. At least 20 mole % terminal reactive primary amine groups are preferred. When 1,4-bis-primary amino lower alkyl piperazines are used, a primary amino (—NH$_2$) group is not only available, it is also linked through a short alkylene chain (less than seven carbons long, preferably less than four carbons long) to a tertiary nitrogen which greatly increases the reactivity of this —NH$_2$ group.

The polyamides used in this invention are preferably thermoplastic and exhibit some or substantially all of the properties of a hot melt composition. Having hot melt characteristics means that some bonding can be obtained by the hot melting behavior itself, even before reactions with the epoxide component have progressed beyond the initial stages of cure. One can thus take advantage of the bond provided by the hot melt behavior, e.g. by forming an article with sufficient integrity to be put to use, stored, or further processed while the epoxy curing reactions are progressing. By contrast, it is necessary with some prior art epoxy resin systems to mechanically hold the article together until the cure at the adhesive joints or bonds have provided enough structural integrity to remove the mechanical supports, clamps, etc.

The total molecular weight of the polyamides used in this invention is similar to known polyamides, e.g. those disclosed in U.S. Pat. No. 3,377,303 (Peerman et al.), issued Apr. 9, 1968 and U.S. Pat. No. 3,565,837 (Drawert et al.), issued Feb. 23, 1971. Melting points and/or softening points of polyamides of this invention should be in the same range as conventional hot melt adhesives, i.e. 60°–200° C.

To obtain the most advantageous "hot melt" effect, melt viscosities of the polyamides are preferably in the range of 500 to 60,000 centipoise. For example, a particularly useful range of viscosity is 9,000–30,000 cps, determined at 200° or 210° C. for polyamide with a ball and ring softening point within the range of 120°–150° C.

LATENT OR SLOW CURING

The Part A and Part B components can be combined to form a one-part, two-component thermosetting epoxy adhesive with either latent or slow curing characteristics. "Latent curing" means that a mixture of epoxide prepolymer and polyamide can be made which will remain substantially unreactive until it is exposed to epoxide cure initiation conditions. By "slow curing" is meant a blended two-part adhesive which has a long open time due to the kinetics of the system. The term "open time" is used to designate the period between coating and mating; once the solvent has been substantially removed from the coating, the "open time" preferably exceeds 48 hours or even 96 hours. The initiation conditions for this particular latent system are attained by heating the mixture to a temperature in excess of the ball and ring softening point of the polyamide and, if desired, applying pressure to the substrates which are being mated. While most latent curing systems require that epoxide cure initiation conditions be sustained until curing is completed, once the curing of the disclosed system is initiated it continues even after epoxide cure initiation conditions have been removed and can be completed under ambient conditions.

There are various techniques by which the kinetics of a blended, two-part system can be manipulated to slow down any epoxide/active hydrogen curing reactions which might occur under substantially normal ambient conditions. These techniques make use of a plurality of phases and/or removal of solvent to form non-flowable, relatively latent-curing layers (e.g. dry films). In the solid, solvent-free state, the preferred solid polyamides used in this invention are relatively slow-reacting toward epoxide rings, at least when compared to the reactivity of these same polyamides in the molten or fused state. Cures which could be significantly advanced in minutes or hours at, say, 200° C., may be hardly begun after several days at 20°–25° C. The kinetic impediment can be further increased by formulating a two-phase or multiple-phase system, which, as a solvent-containing liquid, has a long pot life and which, as a dry or substantially solvent-free film, has a long open time. In the preferred two-phase systems, a liquid or solid epoxide is uniformly dispersed throughout the polyamide-containing phase. A high degree of dispersion is preferred (e.g. a degree of dispersion similar to a colloidal sol or gel), so that the cure can be effectively initiated at 60° to 200° C. If too much phase separation occurs (e.g. settling of the dispersed phase), the adhesive bonding characteristics of the blended two-part system can be impaired. Accordingly, the epoxide prepolymer should be uniformly and intimately distributed (i.e. dissolved or dispersed) through the polyamide solution. As will be apparent from the foregoing discussion, single phase blends of epoxide (liquid or solid), solvent, and the preferred solid polyamide also have adequate pot life under normal ambient conditions and a long open time capability when the solvent has evaporated off, leaving a substantially dry film comprising an intermolecular epoxide/polyamide mixture. If a pot life of several hours is not adequate for use with the bonding procedures or equipment, mixing and metering equipment known in the art can be used, so that the size of the reservoir of blended epoxide/polyamide mixture is kept to a minimum or even eliminated.

One of the latent curing adhesives of this invention is formed by dissolving 5 to 300 parts by weight of the polyamide in 100 parts of a suitable solvent (described subsequently) and intimately and uniformly distributing the epoxide prepolymer in the polyamide solution. The uniform mixture can then be applied to one or all of the substrates which are to be mated and the solvent allowed to evaporate in order to form a non-flowable, latent-curable film comprising a mixture of unreacted epoxide prepolymer and polyamide. Distribution of the epoxide phase in the polyamide solution can be obtained with simple mixing. Upon mixing, the epoxide prepolymer emulsifies or disperses or otherwise forms a discrete phase in the polyamide-solvent solution. As a result, substantially non-settling drops (drops smaller than 1,000 microns in diameter and preferably colloidal or dispersoid in size) of the prepolymer are dispersed uniformly throughout the continuous phase. When the film is cast or coated onto the substrate and the solvent evaporates, a film of polyamide is formed with the microdroplets of prepolymer dispersed throughout. This two-phase relationship apparently minimizes reactivity between the prepolymer and the polyamide and thus allows coated substrates to be stored for several days open time prior to mating under epoxy cure initiation conditions. The fact that the two phases are in intimate contact in the dried film means that, despite the relative latency of the system, the kinetics and thermodynamics of the system may permit some curing; thus storage ("open time") cannot be for indefinite periods. Prior to coating and solvent evaporation, i.e. while the blended system is still in the pot, the conditions are even more likely to permit premature curing, but a pot life of several hours at 20°-25° C. can be provided. For example, preferred formulas of this invention have been found to have "pot-lives" of more than 6 hours at 23° C.

Any polar liquid solvent with an acceptable evaporation rate, which is a good solvent for the polyamide, and which is a poor solvent for the epoxide prepolymer can be used to provide the continuous, polyamide-containing dispersion medium. Mixtures of solvents can be used to vary the evaporation rate, vary the compatibility of the cosolvent mixture toward epoxides, etc. Solvent systems (including solvent mixtures) which do not dissolve commercially available epoxy prepolymers at all are most preferred. Among those solvent systems which can be used are lower alkanols, lower alkanoic amides, chlorinated hydrocarbons, aromatic compounds, nitrated hydrocarbons, lower alkanoic acids, lower alkanones, mixtures of these organic liquids, and mixtures of these organic liquids with each other and/or with water. (The Term "lower", as in "lower alkanol", denotes alkanols, etc. having from one to six carbon atoms.) Mixtures of water and ethanol, water and isopropyl alcohol, water and n-propyl alcohol, and water and secondary butyl alcohol have been found to be particularly effective solvents. These alcohol cosolvent systems can contain 0-80% by weight (e.g. 1-60% by weight) water or other polar cosolvents. While the polyamide is not completely soluble in these water-alcohol systems alone, it has been found that the addition of a small amount of glacial acetic acid greatly enhances the solubility of the polyamide. An acceptable evaporate rate is provided when the solvent system has a substantial vapor pressure under normal ambient conditions. Such vapor pressures are ordinarily provided by solvents with boiling points ranging from about 30° to about 200° C.

Another method which has been found to be effective in producing a latent curing adhesive is to pulverize a solid prepolymer into substantially non-settling particles (of a particle size similar to the microdrops) which are then dispersed in the solution containing the polyamide. The resulting dispersion is a one-part, curable system with an extended pot life. Solid epoxy-novalac resins (e.g. Dow's Novalac resin XT-7855) have been found to be virtually insoluble in a solution comprised of polyamide dissolved in a lower alcohol-water solvent and to show virtually no reactivity or solubility in the cast polyamide film once the solvents have been allowed to evaporate. The cast, dried film is a continuous phase of polyamide resin with finely divided particles of solid epoxy prepolymer dispersed therein. Tests have been shown virtually no reactivity between the polyamide and dispersed epoxy prepolymer for in excess of three months open time. The only requirement for the solid epoxy prepolymers is that they can be pulverized. Talc may be added to the solid epoxy prepolymer to prevent blocking, water may be added to help achieve a good grind, and thixotropic agents may be included to control or alter the viscosity or further retard settling of the epoxy prepolymer particles.

In any of the solvent-containing, blended two-part systems of this invention, this "solids" (non-volatile) content can range from about 5 to about 75% by weight. Polyamide solutions used as the Part B component have a similar "solids" content.

OTHER INGREDIENTS

The polyamides used in this invention can have a significant plasticizing effect; accordingly, it is ordinarily unnecessary to add the usual ester-type plasticizer. However, where exceptionally high levels of plasticizing are useful, ester-type compounds or their equivalents can be added to one or both parts of the two-part system. Pigments, fillers, reinforcers, thickeners, thixotropes, vinyl polymers, tackifier resins, and other materials which can be used in standard solvent-containing epoxy adhesives, novalac compositions, or hot-melt systems can be used in this epoxy system. Catalysts and initiators such as dicyandiamide can be added to the polyamide component to speed up immediate curing and thereby increase the initial bond strength.

PART A/PART B RATIOS

The ratios of the epoxide component to the polyamide component are similar to those commonly used in this art and can range from 0.5:1 to 10:1 by weight. Ordinarily, an excess of Part B is preferred, e.g. at least 1.5:1. (These ratios assume 100% "solids" Part A and Part B components.)

SUBSTRATES

The structural adhesive of this invention has been found to work well on galvanized steel, phosphatized steel, aluminum, glass, wood, plastics, ceramics, and various vinyl films. Utility with metal substrates can be particularly important in assembly-line bonding procedures, due to the problems of spot-welding or the like.

METHOD

Although the method of this invention is useful on a batch or individual unit basis, the most significant area of commercial utility lies in assembly-line fabrication techniques wherein joints are continuously being formed as a series of pairs of parts are mated. Continuous conveying techniques are available for such fabrication techniques.

The structural adhesive of this invention is normally used to form an epoxy adhesive-bonded joint between two or more substrates. A latent- or slow-curing adhesive can be applied to one or more substrates which can either be mated immediately under epoxide cure initiation conditions or can be stored and mated at a later time. By selecting epoxy prepolymers, polyamides and solvents in accordance with this invention coated substrates can be stored up to 120 days before mating without a significant sacrifice in bond strength.

Initiation of curing of mated substrates requires a short heating time (e.g. up to 20 minutes), whereby the adhesive is heated to a temperature in excess of the ball and ring softening point of the polyamide. This melts the polyamide and allows it to act as a hot melt to form an immediate bond; it also initiates the curing reaction between the epoxide prepolymer and the polyamide. The joint being formed is preferably also subjected to a pressure of from 20 to 2,000 psi. The adhesive film can be applied to either one or both of a pair of substrates to be bonded. Application to both substrates is ordinarily preferred. Although the adhesive is not completely cured during this short heating time, mating the substrates for up to 20 minutes, preferably 1–180 seconds, under epoxide cure initiation conditions can develop a bond which has sufficient immediate strength to allow further handling or assembly of the mated substrates. Upon cooling and completion of the curing reaction, the bond can have a tensile shear strength of 100 to 4,000 psi. Once the joint has been mated and cooled, curing will continue at room temperature and usually be completed in 12 hours to 30 days. This curing over time is usually characterized by an increase in the tensile shear strength of the joint. The initial strength of the bond assembly will generally be directly proportional to the temperature at which it is mated and the time it is held at that temperature. The method and adhesive system of this invention is thus very well suited to assembly line operations where immediate bond strength is required and final curing can occur under ambient conditions during further processing or storage.

The means for applying adhesives to joints are well known in the art and include the use of roll coaters, brushes, hand rollers, and spray or curtain coaters. Dry thicknesses obtained after application of the adhesive to the substrate typically range from 0.1 to 25 mils, depending upon the viscosity of the adhesive, the coating technique, the number of passes through a coater, etc. Wet thicknesses typically exceed dry thicknesses by a factor of 1.1 up to 10.

The principle and practice of the present invention is illustrated by the following non-limiting Examples, wherein amounts are given and percentages are by weight unless otherwise indicated. In the Examples the T-peel strength test is based on ASTM D-1876 and the tensile shear strength test on ASTM D-1002, both tests being conducted at 75° F. (23.9° C.) unless otherwise indicated. All curing was at 75° F. unless otherwise indicated. The dicarboxylic acid/polyoxyalkylene amine/alkylene diamine/bisaminopiperazine polyamide of these Examples and other similar polyamides are also disclosed in the aforementioned application of Ramesh Mehta, U.S. Ser. No. 725,012, filed Sept. 20, 1976.

EXAMPLE 1

The polyamide component was prepared as follows: 500 parts by weight (57.2%) of polymeric tall oil fatty acid containing 96% of dimeric fatty acids ("EMPOL" 1014, trademark of Emery Industries, Inc.) was heated to 60° C. under nitrogen with 125 grams (14.3%) of azelaic acid. Fifty parts by weight (5.7%) of polyoxypropylene amine ("JEFFAMINE" D-400, trademark of Jefferson Chemical Company, Inc., approximate molecular weight of 400), 155 parts by weight (17.7%) of 1,4-bisaminopropyl piperazine and 44 parts by weight (5.0%) of ethylenediamine were added and the temperature was raised to 235° C. over 2 hours. The temperature was then held for three hours at 235° C. During the last 2 hours a vacuum of 25 mm/Hg was applied for improved removal of the water reaction. The polyamide obtained had a ball and ring softening point of 125° C. and a total amine number of 70.

Forty parts of the polyamide were then completely dissolved in a solvent consisting of 27.3 parts ethanol, 35.0 parts toluene, and 4 parts 2-nitropropane and the mixture was blended until uniform.

Eight parts of diglycidyl ether-Bis-phenol A epoxy resin ("EPON" 828, trademark of Shell Chemical), 3 parts dimethyl formamide, 6 parts VAGH vinyl, and 21 parts methylene chloride were uniformly mixed. This mixture was then uniformly dispersed in the polyamide-solvent solution. The resulting adhesive mixture was 37.4% solids and had a pot life of approximately 8 hours at 25° C. The adhesive mixture was applied to one or both of several pairs of substrates at thicknesses which would result in dry thicknesses of about 3 mils if only one substrate of a pair was to be coated and about 1½–2 mils if both substrates of a pair were to be coated. It was found that these films could be satisfactorily dried, i.e. the solvent sufficiently evaporated, after four hours at room temperature, or after 30 minutes at 65° C., or after 2 minutes at 150° C. Within a short time after the films were dry, pairs of substrates were mated and tested for T-peel and tensile shear strength as follows:

T-Peel Strength

All substrates acid etched 2024 aluminum
A. Both substrates coated, mated for 1 minute at 93° C. (200° F.)
  1. 24 hours cure = 34 lbs.
  2. 7 days cure = 36 lbs.
  3. 14 days cure = 35 lbs.
B. One substrate coated, mated 1 minute at 150° C. (300° F.)
  1. 24 hours cure = 25 lbs.
  2. 7 days cure = 28 lbs.
C. One substrate coated, mated 1 minute at 171° C. (340° F.)
  1. 24 hours cure = 20 lbs.
  2. 7 days cure = 30 lbs.
D. Both substrates coated, mated 15 minutes at 150° C. (300° F.) and cured for 7 days at 75° F.
  1. Tested at 40° F. = 11 lbs.
  2. Tested at 75° F. = 21 lbs.
  3. Tested at 125° F. = 18 lbs.
  4. Tested at 150° F. = 11 lbs.
  5. Tested at 200° F. = 6 lbs.

Tensile Shear Strength

I. 2024 aluminum, one substrate coated
A. Both substrates wiped with methyl ethyl ketone only, mated 1 minute at 150° C.
  1. 24 hours cure = 1,500 psi
  2. 7 days cure = 1,920 psi
B. Both substrates acid etched, mated 1 minute at 150° C.

1. 24 hours cure = 1,280 psi
2. 7 days cure = 2,850 psi

II. Mild steel, methyl ethyl ketone wiped only, both substrates coated
  A. Mated 1 minute at 93° C. (200° F.)
    1. 24 hours cure = 940 psi
    2. 7 days cure = 1,720 psi
    3. 13 days cure = 1,970 psi
  B. Mated 15 minutes at 150° C.
    1. Initial strength = 2,500–3,000 psi III. Acid etched 2024 aluminum, both substrates coated, mated 15 minutes at 150° C. plus 7 days cure at 75° F.
  1. Tested at −40° F. = 4,000 psi
  2. Tested at 75° F. = 3,000 psi
  3. Tested at 150° F. = 1,000 psi

EXAMPLE 2

Thirty parts of polyamide of Example 1 were dissolved in a solvent consisting of 35 parts isopropyl alcohol, 35 parts water, and 0.65 parts glacial acetic acid. Six parts of diglycidyl ether-Bis-phenol A epoxy resin ("EPON" 828, trademark of Shell Chemical) was uniformly dispersed in the polyamide-solvent solution. The resulting latent curing adhesive mixture was then applied to both substrates of several pairs of substrates which were allowed to sit for varying periods of open time and then marked in a press at 200 psi under varied times and temperatures and tested for tensile shear strength after varying periods of cure with the following test results:

A. Solvent wiped 2024 aluminum, both substrates coated, 24 hour film open time, mated 3 minutes at 150° C. under 200 psi
    1. Initial strength = 1,200 psi
    2. 13 days cure = 2,900 psi
  B. Solvent wiped 2024 aluminum, both substrates coated, 3 day film open time, amted 2 minutes at 150° C. and 200 psi
    1. Initial strength = 1,200 psi
    2. 2 days cure = 1,300 psi
    3. 8 days cure = 2,850 psi
  C. Both substrates coated, 7 days film open time, mated 3 minutes at 150° C. and 200 psi
    1. Solvent wiped 2024 aluminum
      a. 7 days cure = 2,540 psi
      b. 13 days cure = 3,000 psi
    2. Solvent wiped mild steel
      a. 7 days cure = 2,540 psi
      b. 13 days cure = 2,680 psi

EXAMPLE 3

Thirty parts of a polyamide produced by the procedure described in Example 1 were dissolved in a solvent consisting of 35 parts n-propyl alcohol, 35 parts water, and 0.65 parts glacial acetic acid. 5.6 parts of a low molecular weight epoxy novalac resin ("DEN" 431, trademark of Dow Chemical) were uniformly dispersed in the polyamide-solvent solution. The resulting adhesive mixture had a viscosity of 2,500 cps. This mixture was then coated on pairs of substrates which were allowed to sit for various open times and mated under various conditions and then tested for tensile shear strength and T-peel strength at 75° F., with the following results:

Tensile Shear Strength

All substrates solvent wiped only, both substrates of each pair coated, all pairs mated for 2 minutes at 150° C. and 200 psi
  A. 2024 aluminum, film open time 1 hour at 75° F. plus 10 minutes at 93° C.
    1. Initial strength = 1,200 psi
    2. 24 hours cure = 2,200 psi
    3. 4 days cure = 2,450 psi
    4. 27 days cure = 3,470 psi
  B. 2024 aluminum, film open time 7 days
    1. Initial strength = 2,400 psi
    2. 4 days cure = 2,400 psi
    3. 20 days cure = 3,150 psi
  C. Film open time 4 days

|    |                  |   | Aluminum  | Mild Steel |
|----|------------------|---|-----------|------------|
| 1. | Initial strength | = | 1,000 psi | 1,000 psi  |
| 2. | days cure        | = | 2,650 psi | —          |
| 3. | 23 days cure     | = | 3,570 psi | 2,960 psi  |

T-Peel Strength

All substrates 2024 aluminum, both substrates of each pair coated
  A. Film open time 5 days after 12 minutes drying at 93° C. (200° F.), mated for 15 minutes at 150° C. and 200 psi
    1. Initial strength = 45 lbs./inch
  B. Film open time 4 days, mated for 2 minutes at 150° C. and 200 psi
    1. 1 day cure = 42 lbs./inch
    2. 23 days cure = 30 lbs./inch

EXAMPLE 4

The adhesive mixture of Example 3 was allowed to sit in the pot for 6 hours and was then applied to both substrates of several pairs of solvent wiped 2024 aluminum substrates which were allowed to sit for 5 days film open time and then mated for 2 minutes at 150° C. and 200 psi. The tensile shear strength was 100 psi initially, 200 psi after 24 hours of cure, 2,800 psi after three days of cure, and 3,480 psi after 16 days of cure.

EXAMPLE 5

6.7 Parts of an 85% solids solution of epoxy novalac ("DEN" 438, trademark of Dow Chemical) in acetone was uniformly dispersed in the polyamide-solvent solution of Example 3 to form an adhesive mixture. Both substrates of several pairs of solvent wiped 2024 aluminum substrates were mated at 200 psi and tested as follows:

Tensile Shear Strength
  A. 6 days film open time, mated 2 minutes at 150° C.
    1. Initial strength = 1,200 psi
    2. 2 days cure = 2,100 psi
    3. 7 days cure = 2,550 psi
  B. 10 days film open time, mated 2 minutes at 150° C.
    1. Initial strength = 1,700 psi
    2. 3 days cure = 2,600 psi
    3. 6 days cure = 3,300 psi
  C. 9 days film open time, mated 1 minute at 150° C.
    1. Initial strength = 1,300 psi
    2. 9 days cure = 2,550 psi
    3. 16 days cure = 3,000 psi T-Peel Strength
  A. 4 days film open time, mated 2 minutes at 150° C.

1. 1 day cure = 40 lbs./inch
2. 23 days cure = 30 lbs./inch

B. 9 days film open time, mated 1 minute at 150° C.
1. Initial strength = 36 lbs./inch
2. 32 days cure = 40 lbs./inch C. 6 days film open time, mated 2 minutes at 150° C.
1. 23 days cure = 40 lbs./inch

EXAMPLE 6

6.5 Parts of a solid epoxy novalac resin (Dow XD-7855), 1.6 parts of talc, and 7.4 parts water were mixed and then ball milled to pulverize the resin. The pulverized resin mixture was then dispersed in 100.65 parts of the polyamide-solvent solution of Example 3 to form an adhesive mixture. The adhesive mixture was then applied as a film to both members of several pairs of substrates which were mated at 200 psi and tested for tensile shear strength as follows:

A. Solvent wiped 2024 aluminum, 6 days film open time, mated 3 minutes at 150° C.
1. Initial strength = 850 psi
2. 4 days cure = 1,850 psi
3. 19 days cure = 2,300 psi B. Solvent wiped 2024 aluminum, 4 weeks film open time, mated 2 minutes at 150° C.
1. Initial strength = 1,400 psi
2. 4 days cure = 1,750 psi
3. 20 days cure = 2,850 psi C. Acid etched 2024 aluminum, 3½ months film open time, mated 2 minutes at 150° C.
1. Initial strength = 1,400 psi
2. 3 days cure = 2,700 psi D. Solvent wiped mild steel, 3 months film open time, mated 2 minutes at 150° C.
1. Initial strength = 900 psi
2. 3 days cure = 2,500 psi

What is claimed is:

1. A one-part, curable epoxy prepolymer/polyamide system comprising:
   a. a continuous phase comprising a polar solvent system containing a polar organic liquid, said solvent system being generally incapable of dissolving an epoxy prepolymer, said polar organic liquid having a boiling point below 200° C. under normal ambient conditions; and, dissolved in each 100 parts by weight of said solvent system, 5 to 300 parts by weight of a polyamide having a ball and ring softening point within the range of 60°-200° C. and containing at least 20 mole % terminal groups which are residues of 1,4-bis-alkylamino piperazine, and, linked by amido linkages thereto, the residue of a polyfunctional carboxylic acid; and
   b. a discontinuous, substantially non-settling phase dispersed uniformly throughout said continuous phase, said discontinuous phase being selected from the group consisting of solid particles of a solid epoxy prepolymer and droplets of a liquid epoxy prepolymer, said epoxy prepolymer having an epoxide equivalent weight greater than 60.

2. A one-part composition according to claim 1 wherein said solvent system comprises a mixture of a lower alkanol, water, and a lower alkanoic acid; and wherein said epoxy prepolymer is a finely-divided solid which is substantially insoluble in said solvent system.

3. A coated substrate comprising a solid substantially uncured, substantially solvent-free coating on said substrate, said coating comprising the composition of claim 1 wherein said solvent system has been removed by evaporation.

4. A coated substrate according to claim 3 which has been heated to at least 60° C. to cure said coating.

5. A method for forming an epoxy adhesive-bonded joint between a plurality of articles coated with both parts of a two-part epoxy adhesive, said method comprising:
   a. blending said two parts of said epoxy adhesive, one of said parts comprising an epoxide prepolymer dissolved in solvent, the other of said parts comprising a solid polyamide having a softening point within the range of 65°-200° C. and at least 20 mole % terminal reactive primary amine groups which are residues of 1,4-bisalkylamino piperazine, said polyamide being dissolved in a solvent, the solvents for said epoxide prepolymer and said polyamide being selected to provide a cosolvent system for both parts of said epoxy adhesive;
   b. coating the resulting blended, two-part epoxy adhesive onto a surface of a first said article to form a wet film;
   c. evaporating off said cosolvent system to provide a dry film of two-part epoxy adhesive, essentially before the dissolved polyamide and epoxide prepolymer have an opportunity to chemically interact;
   d. mating a second said article with the coated article with the coated article obtained in said steps (b) and (c), under heat and pressure, whereby curing of said two-part epoxy adhesive is initiated; and
   e. removing said heat and pressure and continuing said curing under normal ambient conditions.

6. A method for forming an epoxy adhesive-bonded joint between a plurality of substrates, comprising:
   a. applying to at least one of said substrates a substantially uniform mixture comprising:
      1. a solution comprising a solid, primary-amine terminated polyamide dissolved therein and a suitable solvent therefor, said polyamide having a ball and ring softening point within the range of 60°-200° C.;
      2. uniformly and intimately distributed through said solution, an epoxide prepolymer having an epoxide equivalent weight greater than 60; said epoxide prepolymer being substantially unreacted with said polyamide;
   b. removing sufficient solvent from said solution to cause said uniform mixture to become a non-flowable material under normal ambient temperature and pressure conditions; said non-flowable material being capable of cure initiation at temperatures above 60° C. and being capable of continued curing at normal ambient temperatures, subsequent to such cure initiation;
   c. mating said plurality of substrates;
   d. forming a joint with the thus-mated substrates under epoxide cure initiation conditions, which conditions include applying a temperature greater than 60° C. to said joint for more than 1 second but less than 20 minutes, whereby said polyamide is:
      1. brought to a temperature above its ball and ring softening point;
      2. forms a flowable phase reactive with said epoxide prepolymer; and
      3. enters into an amine/epoxide curing reaction with said polyamide;

e. removing said epoxide cure initiation conditions before said amine/epoxide curing reaction is complete, but after the strength of the joint is sufficient to permit further handling of the mated substrates;

f. continuing said amine/epoxide curing reaction under substantially normal ambient pressure and temperature conditions for at least 12 hours, the continuing of said curing reaction being characterized by an increase in the tensile shear strength of said joint.

7. A method according to claim 6 wherein said forming step includes applying pressure and temperature of 60°-200° C., to said joint for a period of time less than about 20 minutes.

8. A method according to claim 7 wherein said period of time is about 1-180 seconds.

9. A method according to claim 8 wherein the tensile shear strength of said joint approaches 4,000 p.s.i. over a period of about 30 days.

10. A method according to claim 7 wherein the pressure applied to said joint ranges from 20 to 2,000 p.s.i.

11. A method according to claim 6 wherein said step (c) and said step (d) are carried out simultaneously.

12. A method according to claim 6, wherein:
 a. said epoxide prepolymer and said polyamide are blended together in the presence of an organic liquid cosolvent for said epoxide prepolymer and said polyamide, whereby an organic liquid containing said epoxide prepolymer and said polyamide in solution is obtained; said organic liquid being coated onto a said substrate to form a wet film;
 b. permitting said wet film to evaporate said cosolvent until a single, solid, latent-curable phase comprising an intermolecular mixture of said epoxide prepolymer and said polyamide is obtained;
 c. applying heat and pressure to said joint, whereby said solid phase is liquefied and rendered non-latent in its curing characteristics; and
 d. cooling said joint to normal ambient conditions without interrupting said amine/epoxide curing reaction.

13. A method according to claim 12 wherein said organic liquid is coated onto a series of substrates being continuously conveyed along an assembly line, wherein a series of joints is formed by mating pairs of substrates on said assembly line, and wherein each said joint is treated with heat and pressure to provide an adhesively bonded joint capable of withstanding further operations of said assembly line.

14. A method according to claim 6 wherein said epoxide prepolymer is a particulate solid uniformly dispersed through said uniform mixture.

15. A method according to claim 6 wherein said polyamide is a reaction product of the components comprising:
 a. a 1,4-bis-primary amino lower alkyl piperazine;
 b. a polyfunctional carboxylic acid or functional equivalent thereof.

16. A method according to claim 15 wherein said uniform mixture further comprises at least additional ingredients selected from the group consisting of: a vinyl polymer, an epoxy-novolac resin, and a tackifier resin.

17. A method according to claim 6 wherein solvent for said polyamide is an organic liquid selected from the group consisting of: a lower alkanol, lower alkanoic amide, a chlorinated hydrocarbon, an aromatic compound, a nitrated hydrocarbon, a lower alkanoic acid, a lower alkanone, mixtures of said organic liquids with each other, and mixtures of any of said organic liquids with water.

18. A method according to claim 17 wherein said solvent is a cosolvent for said epoxide prepolymer.

19. A method according to claim 6 wherein the substrates to which said uniform mixture has been applied are stored after completion of said step (b) and kept in storage from 1 to 120 days before mating in accordance with said step (c).

20. A method according to claim 6 wherein said amine/epoxide curing reaction is carried out according to the following schedule:

| Time | Temperature | Pressure |
| --- | --- | --- |
| 1 second – 20 minutes | 60–200° C. | 20–2,000 p.s.i. |
| 12 hours – 30 days | normal ambient | normal ambient | and whereby the following tensile shear strengths of said joint are obtained:

| Time | Tensile Shear Strength in lbs/sq. inch |
| --- | --- |
| 1 second – 20 minutes | at least about 100 |
| 12 hours – 30 days | from about 100 to 4,000 |

* * * * *

UNITED STATES PATENT AND TRADEMARK OFFICE
CERTIFICATE OF CORRECTION

PATENT NO. : 4,070,225
DATED : January 24, 1978
INVENTOR(S) : Vernon H. Batdorf

It is certified that error appears in the above—identified patent and that said Letters Patent are hereby corrected as shown below:

```
column 5, line 42, for "melting" read --melt--.
column 8, line 14, omit "been".
column 11, line 29, for "marked" read --mated--.
column 11, line 43 should be indented.
column 11, line 44, for "days" read --day--.
column 12, line 18, for "2. days cure" read --2. 3 days
  cure--.
```

Signed and Sealed this

Twelfth Day of September 1978

[SEAL]

Attest:

RUTH C. MASON
Attesting Officer

DONALD W. BANNER
Commissioner of Patents and Trademarks